United States Patent [19]
Yale et al.

[11] 3,898,224
[45] Aug. 5, 1975

[54] 1,6,7,8-TETRAHYDRO-4-OXO-4H-PYRIDO [1,2-A]PYRIMIDINE-9-CARBOALKOXY COMPOUNDS

[75] Inventors: Harry L. Yale, New Brunswick; Ervin R. Spitzmiller, Edison, both of N.J.

[73] Assignee: E. R. Squibb & Sons, Inc., Princeton, N.J.

[22] Filed: Sept. 9, 1974

[21] Appl. No.: 504,011

[52] U.S. Cl...... 260/251 A; 260/295 R; 260/471 A; 260/473 R; 260/476 R; 260/482 R; 260/483; 424/251
[51] Int. Cl.² ............... A61K 31/505; C07D 471/04
[58] Field of Search .................................. 260/251 A

[56] References Cited
OTHER PUBLICATIONS
Antaki, J. Org. Chem. 27, 1371–1374 (1962).

Primary Examiner—Donald G. Daus
Assistant Examiner—Diana G. Rivers
Attorney, Agent, or Firm—Lawrence S. Levinson; Merle J. Smith; Donald J. Barrack

[57] ABSTRACT

Compounds having the structure

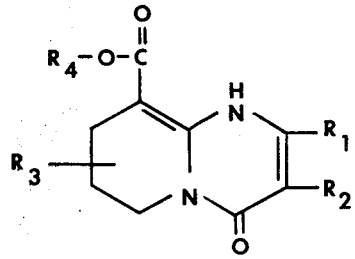

or a pharmaceutically acceptable salt thereof, wherein $R_1$ is alkyl or aryl; $R_2$ is hydrogen or alkyl; $R_3$ is hydrogen, halogen, alkyl, or aryl; and $R_4$ is alkyl, have useful antidepressant activity.

9 Claims, No Drawings

1,6,7,8-TETRAHYDRO-4-OXO-4H-PYRIDO[1,2-A]PYRIMIDINE-9-CARBOALKOXY COMPOUNDS

BRIEF DESCRIPTION OF THE INVENTION

Compounds having the structure

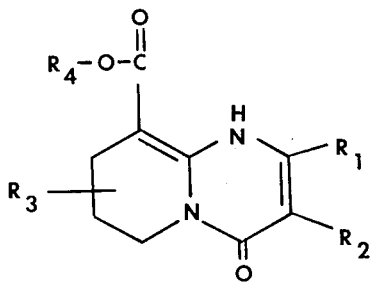

and the pharmaceutically acceptable salts thereof, are useful as antidepressants. In formula I, and throughout the specification, the symbols are as defined below.

$R_1$ is alkyl or aryl;
$R_2$ is hydrogen or alkyl;
$R_3$ is hydrogen, halogen, alkyl, or aryl; and
$R_4$ is alkyl.

The term "alkyl," as used throughout the specification, refers to straight or branched chain alkyl groups having 1 to 6 carbon atoms. Alkyl groups having 1 to 3 carbon atoms are preferred.

The term "alkoxy," as used throughout the specification, refers to a group having the formula Y—O— wherein Y is alkyl as defined above. Alkoxy groups having 1 to 3 carbon atoms are preferred.

The term "halogen," as used throughout the specification, refers to fluorine, chlorine, bromine and iodine; chlorine and bromine are the preferred halogens.

The term "aryl," as used throughout the specification, refers to phenyl or phenyl substituted with one or two substituents selected from alkyl, alkoxy, halogen, and trifluoromethyl.

DETAILED DESCRIPTION OF THE INVENTION

The 1,6,7,8-tetrahydro-4-oxo-4H-pyrido[1,2-a]-pyrimidine-9-carboalkoxy compounds of formula I can be prepared from compounds having the structure II 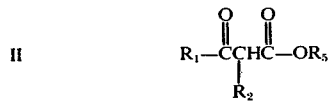

wherein $R_5$ is an alkyl group having 1 to 3 carbon atoms. Reaction of a compound of formula II with a 2-aminonicotinic acid having the structure III 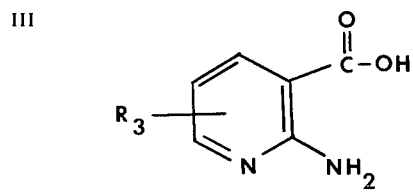

yields the corresponding pyrido[1,2-a]pyrimidin-4-one having the structure

IV 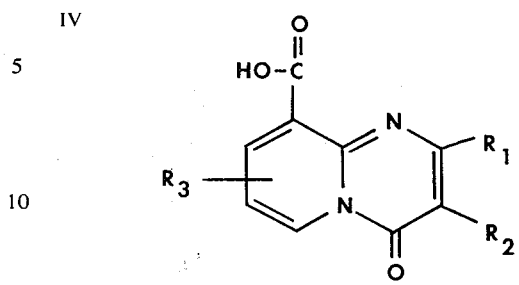

The reaction is run in a hydroxyalkyl ether solvent, e.g. ethylene glycol monomethyl ether or ethylene glycol monoethyl ether under reflux conditions for about 1 day to 10 days, preferably 2 days to 5 days. The reaction mixture should contain p-toluenesulfonic acid in an amount of from about 0.2 mole to 0.5 mole per mole of aminopyridine; the use of about 0.25 mole of p-toluenesulfonic acid per mole of aminopyridine is preferred.

Alternatively, the intermediates of formula IV can be prepared by reacting a 2-aminonicotinic acid of formula III with an aminocinnamate having the structure V 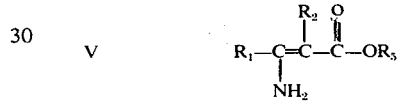

The reaction is run in an aromatic solvent such as xylene or diethylbenzene, at elevated temperatures, preferably 130°C to 190°C. Depending of course on the particular reactants, and the temperature of the reaction, the reaction will take from 1 to 4 days. This procedure is not applicable when $R_1$ is phenyl substituted with iodine because of the difficulty in preparing the appropriate aminocinnamate.

The carboxylic acid intermediate of formula IV can be esterified using procedures well known in the art. Reaction of a carboxylic acid of formula IV with an alkanol having the formula VI     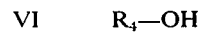 $R_4$—OH yields the corresponding ester having the structure VII 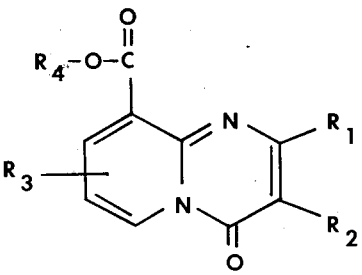

Catalytic reduction of a compound of formula VII yields the novel compounds of formula I. The reduction reaction can be run using hydrogen gas at a pressure of from 15 psig to 75 psig. While the reaction can be run at a temperature of from 15°C to 50°C, it is most conveniently run at room temperature. The catalyst used is preferably Raney nickel.

The compounds of formula II are known, and can be readily prepared by reacting an acid chloride having the structure VIII 

with a carboxylic acid ester having the structure

IX 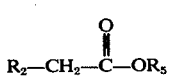

in the presence of a sodium alkoxide (e.g., sodium methoxide); see for example, *Organic Reactions*, Vol. 1, Chapter by C. R. Hauser and B. E. Hudson, Jr., pg. 266.

The 2-aminonicotinic acids of formula III can be readily prepared from the corresponding quinoline derivative according to the procedure of E. Spath and G. Koller, *Chem. Ber.*, 56:2454 (1923).

The aminocinnamates of formula V are known, and can be readily prepared by reacting a Grignard reagent of the structure X $\qquad$ R$_1$—Mg—X wherein X is chlorine or bromine, with a 1-cyanoacetate having the structure XI 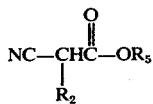

The 1,6,7,8-tetrahydro-4-oxo-4H-pyrido[1,2-a]pyrimidine-9-carboalkoxy compounds of this invention can be converted, using procedures well known in the art, into their pharmaceutically acceptable acid-addition salts. Illustrative of the salts contemplated for use in this invention are the hydrohalides (e.g., the hydrochloride and hydrobromide), sulfate, nitrate, tartrate, phosphate, maleate, fumarate, citrate, succinate, methanesulfonate, benzenesulfonate, toluenesulfonate, and the like.

The compounds of formula I, and the pharmaceutically acceptable salts thereof, are useful for relieving depression (particularly endogenous depression) in mammals, in a manner similar to imipramine, when administered in a daily dose of from 0.5 mg/kg to 3 mg/kg, preferably 1 mg/kg to 2 mg/kg.

The compounds of the present invention can be administered orally in the form of tablets, troches, capsules, elixirs, suspensions, syrups, wafers, chewing gum, and the like. Such compositions and preparations should contain at least 0.1% of active compound. The percentage in the compositions and preparations can, of course, be varied and can conveniently be between about 5 to about 75 percent or more of the weight of the unit. Preferred compositions according to the present invention are prepared so that an oral dosage unit form contains between about 5 and 250 milligrams of active compound.

The following examples are specific embodiments of this invention.

EXAMPLE 1 —
1,6,7,8-Tetrahydro-2-methyl-4-oxo-4H-pyrido-[1,2-a]pyrimidine-9-carboxylic acid, methyl ester

A.
2-Methyl-4-oxo-4H-pyrido[1,2-a]pyrimidine-9-carboxylic acid

2-Aminonicotinic acid (13.8 g, 0.1 mole), methyl acetoacetate (23.2 g, 0.2 mole), and p-toluenesulfonic acid (0.5 g) are stirred and heated under reflux conditions for 72 hours in 100 ml of ethylene glycol monomethyl ether. The mixture is filtered while still hot; the insoluble material is unchanged 2-aminonicotinic acid. The filtrate, on cooling, deposits a crystalline solid. This is filtered and air-dried to give 3.3 grams of material, melting point 220°–221°C, dec. The insoluble material, the filtrate from the 3.3 g and an additional 0.5 g of p-toluenesulfonic acid is stirred and heated under reflux for 24 hours to give 2.1 g of material, melting point 220°–221°C, dec. The 3.3 g and 2.1 g are combined and heated with 450 ml of toluene under reflux conditions, and the mixture is filtered while still hot to remove an additional 1.1 g of unreacted 2-aminonicotinic acid. The filtrate yields 3.3 g of the title compound, melting point 233°–235°C, dec.

B.
2-Methyl-4-oxo-4H-pyrido[1,2-a]pyrimidine-9-carboxylic acid, methyl ester A suspension of 2-methyl-4-oxo-4H-pyrido[1,2-a]pyrimidine-9-carboxylic acid (7 g, 0.034 mole) in a solution of sulfuric acid (3.5 g, 0.035 mole) in 700 ml of absolute methanol is heated with stirring under reflux conditions to achieve solution. The reaction mixture is maintained at reflux for 48 hours. The acidic solution is cooled to room temperature and sodium bicarbonate (6.3 g, 0.07 mole) is added. After stirring for 2 hours, a 50% aqueous solution of a sample of the reaction mixture has a pH of 7.2. The solvent is removed by concentration on a rotary evaporator. The solid residue is extracted twice with 250 ml portions of ether. The ether extracts are combined and the solvent removed by distillation. Recrystallization of the residue (6.5 g) from 200 ml of diisopropyl ether yields 4.4 g of the title compound, melting point 75°–77°C.

C.
1,6,7,8-Tetrahydro-2-methyl-4-oxo-4H-pyrido[1,2-a]pyrimidine-9-carboxylic acid, methyl ester 2-Methyl-4-oxo-4H-pyrido[1,2-a]pyrimidine-9-carboxylic acid, methyl ester (2.2 g, 0.01 mole) is dissolved in 200 ml absolute ethanol and 3 g of pyrophoric Raney nickel is added. The solution is treated with hydrogen at 50 psi at room temperature in a Parr pressure vessel. After 15 minutes, 0.02 mole of hydrogen is absorbed. The catalyst is removed by filtration and the filtrate is concentrated on a rotary evaporator. The residue (2 g) has a melting point of 120°–122°C. Recrystallization from 140 ml of diisopropyl ether yields 1.55 of the title compound, melting point 126°–128°C.

EXAMPLES 2 TO 10

Following the procedure of Example 1, but substituting the compound shown in column I for methyl acetoacetate and the compound shown in column II for 2-aminonicotinic acid, the compound shown in column III is obtained.

| Example No. | Column I | Column II | Column III |
|---|---|---|---|
| 2 | 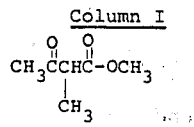 | 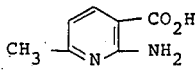 | 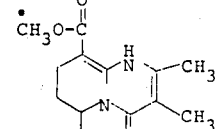 |
| 3 | 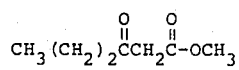 | 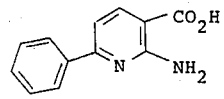 | 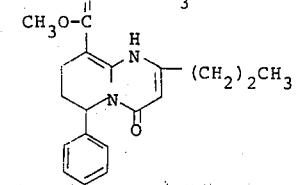 |
| 4 | 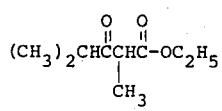 | 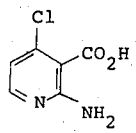 | 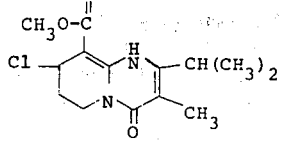 |
| 5 | 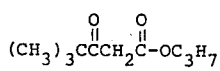 | 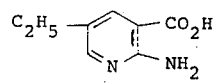 | 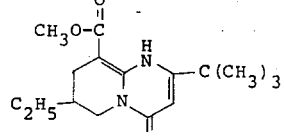 |
| 6 | 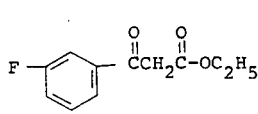 | 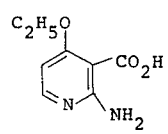 | 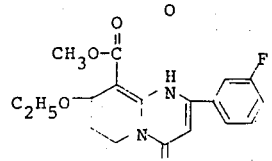 |
| 7 | 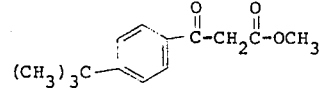 | 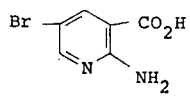 | 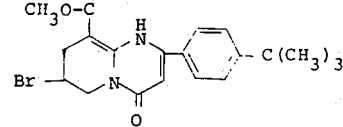 |
| 8 | 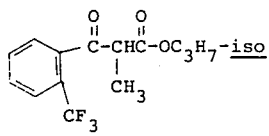 | 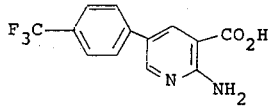 | 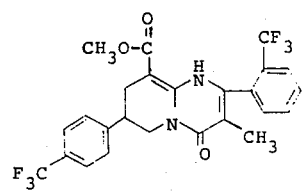 |
| 9 | 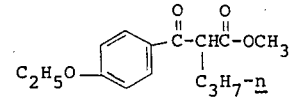 | 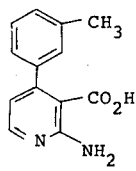 | 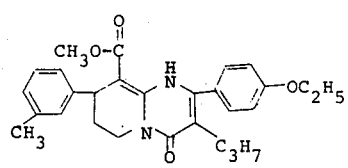 |
| 10 | 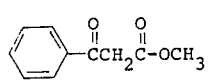 | 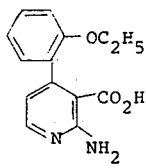 | 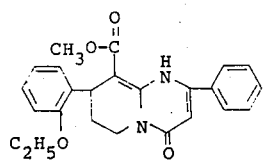 |

What is claimed is:

1. A compound having the structure

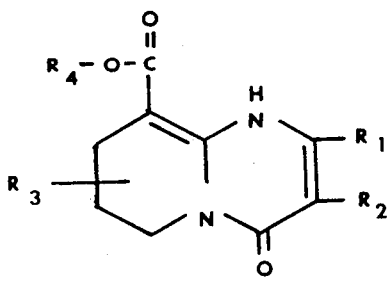

or a pharmaceutically acceptable salt thereof, wherein $R_1$ is alkyl or aryl; $R_2$ is hydrogen or alkyl; $R_3$ is hydrogen, halogen, alkyl or aryl; and $R_4$ is alkyl; wherein alkyl and alkoxy refer to groups having 1 to 6 carbon atoms and aryl refers to phenyl or phenyl substituted with one or two alkyl, alkoxy, halogen or trifluoromethyl groups.

2. A compound in accordance with claim 1 wherein $R_1$ is alkyl.

3. A compound in accordance with claim 1 wherein $R_1$ is phenyl.

4. A compound in accordance with claim 1 wherein $R_1$ is phenyl substituted with one or two alkyl, alkoxy, halogen or trifluoromethyl groups.

5. A compound in accordance with claim 1 wherein $R_2$ is hydrogen.

6. A compound in accordance with claim 1 wherein $R_2$ is alkyl.

7. A compound in accordance with claim 2 wherein $R_2$ is hydrogen.

8. A compound in accordance with claim 1 wherein $R_3$ is hydrogen.

9. The compound in accordance with claim 1 having the name 1,6,7,8-tetrahydro-2-methyl-4-oxo-4H-pyrido[1,2-a]-pyrimidine-9-carboxylic acid, methyl ester.

* * * * *